Dec. 31, 1968  K. ENKE  3,419,100
WHEEL SUSPENSION OF DRIVEN WHEELS, ESPECIALLY OF THE
REAR WHEELS OF A MOTOR VEHICLE
Filed Sept. 6, 1966

INVENTOR
KURT ENKE

BY *Dicke & Craig*
ATTORNEYS

United States Patent Office 3,419,100
Patented Dec. 31, 1968

3,419,100
WHEEL SUSPENSION OF DRIVEN WHEELS,
ESPECIALLY OF THE REAR WHEELS OF A
MOTOR VEHICLE
Kurt Enke, Fellbach, Wurttemberg, Germany, assignor to
Daimler-Benz Aktiengesellschaft, Stuttgart-Unterturkheim, Germany
Filed Sept. 6, 1966, Ser. No. 577,468
Claims priority, application Germany, Sept. 8, 1965,
D 48,148
23 Claims. (Cl. 180—73)

ABSTRACT OF THE DISCLOSURE

A suspension for the rear driven wheels of a motor vehicle wherein the axle gear housing is rigid with an auxiliary frame pivotally mounted to the vehicle superstructure about a horizontal cross axis, and the wheels are spring suspended by means of wheel guide members pivotally mounted to the auxiliary frame about inclined axes, respectively. A torsion rod is rotatably mounted with respect to the vehicle superstructure, drivingly connected at its center to and for movement with the auxiliary frame, and drivingly connected at its ends to and for movement with the wheel guide members, respectively in such a manner that the reaction moment occurring at the axle gear housing during the drive of the wheels produces a torque opposite the lowering or dipping moment of the vehicle superstructure depressing the rear end of the vehicle body during starting or accelerating of vehicle.

Background of the invention

In the prior art, there has been a problem here before in respect to the chamber of the wheels changing during simultaneous deflection thereof, particularly with respect to the rear wheels during acceleration of the vehicle wherein the rear end of the vehicle body dips.

Summary of the invention

The purpose underlying the present invention essentially resides in improving the suspension of the driven wheels of the aforementioned type as regards noise damping and obtainable driving characteristics.

For this purpose, it is provided according to the present invention that the axle gear housing is rigidly connected with an auxiliary frame which, in turn, is pivotally suspended at the vehicle superstructure about a horizontal cross axis and on which engage the wheel guide parts, preferably constructed as oblique guide members.

Several advantages are achieved by the present invention which will be mentioned more fully hereinafter.

During simultaneous spring deflections in the inward or upward direction of both rear wheels, the unit, rigid in itself, of auxiliary frame and axle gear housing, acts as typical longitudinal guide member so that predominantly a longitudinal guide characteristic is established for the wheel guidance during inward spring deflections. As is known, wheel suspensions with longitudinal guide characteristics distinguish themselves, inter alia, by the fact that during inward spring deflection of the wheels no changes in camber or only negligible camber changes occur thereat. The driving properties of the vehicle, especially during straight drives, are influenced thereby in an extraordinarily advantageous manner.

During alternate inward spring deflections of the rear wheels or while driving through curves, the auxiliary frame together with the axle gear housing maintains its position with respect to the vehicle superstructure. Consequently, the wheel guidance is determined thereby exclusively by the wheel guide parts engaging at the auxiliary frame. By the arrangement of inclined or cross guide members there are produced at the rear wheels during curve drives negative camber changes which have as a consequence a neutral driving behavior.

As a result of the indirect securing of the wheel guide parts by way of the auxiliary frame at the vehicle superstructure, the road shocks at the wheels are lessened in their effect on the vehicle superstructure and are effectively damped by the elastic connecting elements between the auxiliary frame and the vehicle superstructure or wheel guide parts.

Accordingly, it is an object of the present invention to provide a wheel suspension for the driven wheels of the type described above which eliminates, by simple means, the shortcomings encountered with the prior art constructions, and further improves the suspension in the several aspects mentioned above.

Another object of the present invention resides in an independent wheel suspension for the driven wheels, especially for the driven rear wheels of motor vehicles, which improves not only the driving properties but also improves the noise absorption.

A further object of the present invention resides in an independent wheel suspension for the driven wheels of motor vehicles which allows a predominant longitudinal guide characteristic during simultaneous spring deflections of the wheels while producing negative camber changes during unilateral spring deflections of a wheel.

Still a further object of the present invention resides in a wheel suspension for independently suspended driven wheels of a motor vehicle which provides favorable driving properties particularly during straight drives of the vehicle.

Still another object of the present invention resides in an independent wheel suspension for the driven rear wheels of motor vehicles which considerably improves the absorption not only of noises but also of road shocks acting on the wheels of the vehicle.

Brief description of the drawing

These and other objects, features, and advantages of the present invention will become more obvious from the following description when taken in connection with the accompanying drawing which shows, for purposes of illustration only, one embodiment in accordance with the present invention, and wherein.

Detailed description of the drawing

Figure 1:
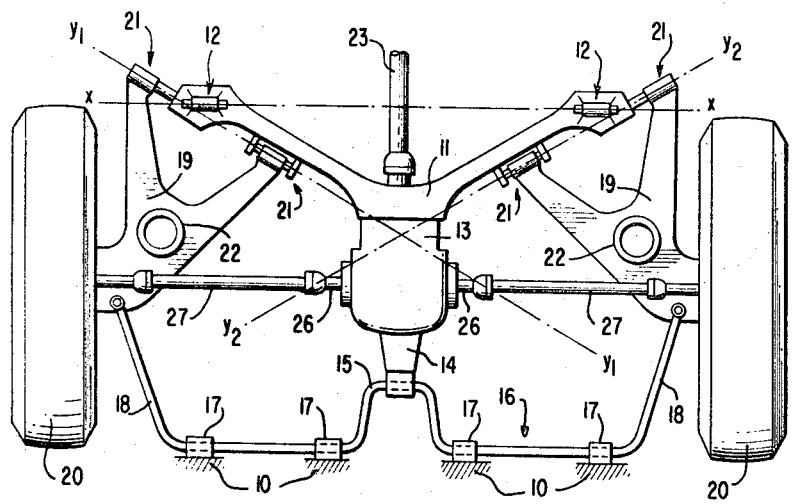
FIGURE 1 is a top plan view on a wheel suspension of the rear wheels of a motor vehicle in accordance with the present invention.

Referring now to the drawing wherein like reference numerals are used throughout the two views to designate like parts, reference numeral 10 indicates the vehicle superstructure schematically shown in the drawing which may be formed by a frame or body, particularly of a self-supporting type body construction. An auxiliary frame 11 is pivotally suspended at the vehicle superstructure 10 about a horizontal cross axis x—x by means of elastic support bearings generally designated by reference numeral 12 and of any conventional construction. The axle gear housing 13 is rigidly connected with the auxiliary frame 11. The axle gear housing 13 is provided with a rearwardly directed rigid arm 14 which is pivotally connected with a cranked portion 15 of a torsion rod stabilizer 16. The torsion rod stabilizer 16 is rotatably supported at the vehicle superstructure 10 in fixed bearings 17 on both sides of the cranked portion 15. The torsion rod stabilizer 16 is provided with lateral arms 18 which are each pivotally connected in any conventional and appropriate manner with a respective inclined guide member 19. The inclined members 19 are pivotally connected or pivotally engage at the auxiliary frame 11 about pivot axes $y_1$—$y_1$ and $y_2$—$y_2$ disposed at an inclination to the vehicle longitudinal direction for the guidance of the respective rear wheel 20. For purposes of damping road shocks and noises, the inclined guide members 19 are pivotally connected at the auxiliary frame 11 by means of elastic bearings generally designated by reference numeral 21 and of any conventional construction. The vehicle wheels 20 are spring-supported with respect to the vehicle superstructure 10 by coil springs 22 which engage at the inclined guide members 19.

The drive of the rear wheels 20 takes place, for example, from a forwardly disposed engine by way of a cardan shaft 23, the axle gear arranged in the axle gear housing 13 having the usual bevel gear pinion 24 and axle drive bevel gear 25 as well as by way of axle drive shafts 26 and the joint shafts 27 which, constructed as double-jointed shafts, are each connected by means of an inner joint with the respective axle shaft 26 and by means of an outer joint with the respective wheel 20 supported on the inclined guide members 19.

During starting or acceleration of the vehicle, the inertia acting at the center of gravity of the vehicle produces a torque by means of which the rear section of the vehicle is pressed against the road surface.

Figure 2:
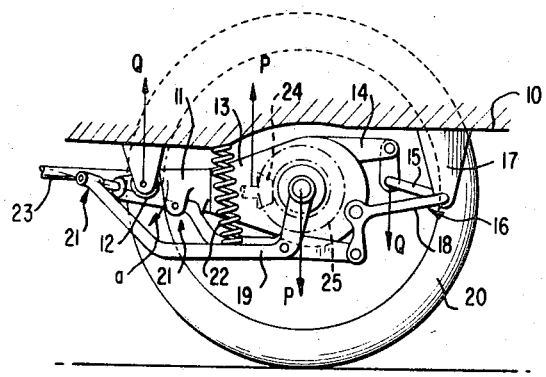
FIGURE 2 is a side elevational view of the wheel suspension of FIGURE 1, with the left rear wheel omitted for the sake of clarity.

On the other hand, forces P occur in the bearings of the pinion 24 and of the spur bevel gear 25 or of the differential gear which produce at the auxiliary frame 11 and therewith at the axle gear housing 13 a torque in the direction of arrow $a$ (FIG. 2). A force Q results from this torque at the cranked portion 15 of the torsion rod stabilizer 16 under whose influence the torsion rod stabilizer 16 seeks to displace the vehicle superstructure 10 away from the stabilizer 16 and therewith away from the road surface.

During simultaneous spring deflections of both rear wheels 20, the torsion rod stabilizer 16 is rotated within the bearings 17 at the vehicle superstructure 10 in the clockwise direction, as viewed in FIGURE 2. As a result thereof, the auxiliary frame 11 together with the axle gear housing 13 carries out a pivot movement about the cross axis $x$—$x$. This pivotal movement of the auxiliary frame 11 is transmitted by way of the bearings 21 to the inclined guide members 19 so that a movement about the axis $x$—$x$ with longitudinal guide characteristics is superimposed on the wheel movement about the axis $y_1$—$y_1$ or $y_2$—$y_2$ with inclined guide characteristics. By appropriate selection of the lever transmission ratio at the suspension parts producing the illustrated superposition of the wheel movements, it is possible to increase more or less the proportion of the wheel movement with longitudinal guide characteristics in order to keep small the occurring camber changes at the rear wheels.

During alternating spring deflections of the rear wheels 20, the auxiliary frame 11 and therewith the axes $y_1$—$y_1$ and $y_2$—$y_2$ maintain the position thereof with respect to the vehicle superstructure 10. The wheel guide characteristic is therefore determined exclusively by the movements of the inclined guide members about the axes $y_1$—$y_1$ and $y_2$—$y_2$ so that during spring deflections of one vehicle wheel 20 a negative camber change occurs thereat. This negative camber change is particularly desirable during curve drives in order to achieve a neutral driving behavior.

I claim:

1. A suspension for driven wheels of a motor vehicle, comprising a vehicle superstructure, a unit comprising axle gear housing means and auxiliary frame means rigidly connected with said axle gear housing means, means for pivotally supporting said auxiliary frame means at said vehicle superstructure about a substantially horizontal cross axis, wheel guide means for supporting the wheels at said auxiliary frame means, spring means for spring-supporting the wheels, and further means between said wheel guide means and said unit for resiliently transferring movement therebetween in such a manner that a torque is produced by the reaction moment occurring at the axle gear housing means during the drive of the wheels which counteracts the moment occurring during acceleration of the wheels and seeks to press the vehicle superstructure against the road surface.

2. A suspension according to claim 1, wherein said further means supports said unit to the rear of the wheel centers and wherein the substantially horizontal cross axis is located ahead of the wheel centers.

3. A wheel suspension according to claim 2, wherein the driven wheels are the rear wheels of a motor vehicle.

4. A wheel suspension according to claim 3, wherein said further means includes stabilizer means rotatably supported at said vehicle superstructure.

5. A wheel suspension according to claim 4, wherein said stabilizer means includes lateral arm portions operatively connected with said wheel guide means and a central, forwardly extending crank portion operatively connected with said axle gear housing.

6. A wheel suspension according to claim 5, wherein said wheel guide means include inclined guide members pivotally supported at said auxiliary frame means about axes extending at an inclination to the driving direction.

7. A wheel suspension according to claim 6, further comprising double-jointed shaft means operatively connecting the axle gear means with the driven wheels, the pivot axis of a respective inclined guide member extending substantially through the center of the inner joint connecting the double-jointed shaft means of the opposite side with the axle gear means.

8. A wheel suspension according to claim 7, wherein the means pivotally connecting the auxiliary frame means at the vehicle superstructure includes elastic bearing means.

9. A wheel suspension according to claim 8, further comprising elastic bearing means for pivotally supporting the inclined guide members of said guide means at said auxiliary frame means.

10. A wheel suspension according to claim 1, wherein said further means includes stabilizer means rotatably supported at said vehicle superstructure.

11. A wheel suspension according to claim 10, wherein said stabilizer means includes lateral arm portions operatively connected with said wheel guide means and a central, forwardly extending crank portion operatively connected with said axle gear housing.

12. A wheel suspension according to claim 1, wherein said wheel guide means include inclined guide members pivotally supported at said auxiliary frame means about axes extending at an inclination to the driving direction.

13. A wheel suspension according to claim 12, further comprising double-jointed shaft means operatively connecting the axle gear means with the driven wheels, the pivot axis of a respective inclined guide member extending substantially through the center of the inner joint connecting the double-jointed shaft means of the opposite side with the axle gear means.

14. A wheel suspension according to claim 13, wherein the means pivotally connecting the auxiliary frame means at the vehicle superstructure includes elastic bearing means.

15. A wheel suspension according to claim 14, further comprising elastic bearing means for pivotally supporting the inclined guide members of said guide means at said auxiliary frame means.

16. A wheel suspension according to claim 1, wherein the means pivotally connecting the auxiliary frame means at the vehicle superstructure includes elastic bearing means.

17. A wheel suspension according to claim 16, further comprising elastic bearing means for pivotally supporting said guide means at said auxiliary frame means.

18. A suspension according to claim 17, wherein said further means supports said unit to the rear of the wheel centers and wherein the substantially horizontal cross axis is located ahead of the wheel centers.

19. A wheel suspension according to claim 18, wherein said further means includes stabilizer means rotatably supported at said vehicle superstructure.

20. A wheel suspension according to claim 1, further comprising elastic bearing means for pivotally supporting said guide means at said auxiliary frame means.

21. A wheel suspension according to claim 1, wherein said further means is only a generally transversely extending torsion bar rotatably supported at said vehicle superstructure, drivingly connected at its center to said auxiliary frame means, and drivingly connected at its ends to respective ones of said wheel guide means.

22. A wheel suspension according to claim 21, wherein said further means is the only spring support for said auxiliary frame means.

23. A wheel suspension according to claim 1, wherein said further means is the only spring support for said auxiliary frame means.

References Cited

UNITED STATES PATENTS

| | | | |
|---|---|---|---|
| 2,968,357 | 1/1961 | Roller | 180—73 |
| 3,277,975 | 10/1966 | Van Winsen | 180—73 |
| 3,327,803 | 1/1967 | Cote et al. | 180—73 |

A. HARRY LEVY, *Primary Examiner.*